US012539879B2

(12) United States Patent
Jafari et al.

(10) Patent No.: US 12,539,879 B2
(45) Date of Patent: Feb. 3, 2026

(54) VEHICLE HUMAN-MACHINE INTERFACE ALERT GENERATION BASED ON OCCLUDED REGIONS

(71) Applicant: GM GLOBAL TECHNOLOGY OPERATIONS LLC, Detroit, MI (US)

(72) Inventors: Rouhollah Sayed Jafari, Troy, MI (US); Stefano Bonasera, Royal Oak, MI (US); Daniel Aguilar Marsillach, Chicago, IL (US); Joseph F. Szczerba, Grand Blanc, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 87 days.

(21) Appl. No.: 18/420,044

(22) Filed: Jan. 23, 2024

(65) Prior Publication Data

US 2025/0236310 A1    Jul. 24, 2025

(51) Int. Cl.
*B60W 50/16* (2020.01)
*B60W 30/18* (2012.01)
(Continued)

(52) U.S. Cl.
CPC ...... *B60W 50/16* (2013.01); *B60W 30/18154* (2013.01); *B60W 50/0097* (2013.01);
(Continued)

(58) Field of Classification Search
CPC ........... B60W 50/16; B60W 30/18154; B60W 50/0097; B60W 60/001;
(Continued)

(56) References Cited

U.S. PATENT DOCUMENTS 9,047,780 B2 * 6/2015 Guarnizo Martinez ..................... G08G 1/168
11,635,763 B2 * 4/2023 Kobashi .......... B60W 60/00272 701/26

(Continued)

FOREIGN PATENT DOCUMENTS

DE    202014003224 U1    7/2015
DE    102018213230 A1    2/2020
(Continued)

OTHER PUBLICATIONS

U.S. Appl. No. 18/499,479, filed Nov. 1, 2023, Bonasera et al.
German Office Action from counterpart DE1020241065427, dated Oct. 30, 2024.

*Primary Examiner* — Mohamed Barakat

(57) ABSTRACT

An example vehicle control system includes a plurality of sensors, a driver monitoring system, a human-machine interface configured to provide at least one of a visual alert, a haptic alert and an audio alert to the driver, and a vehicle control module configured to identify at least one occluded region based on the plurality of sensors, determine a predicted trajectory of the vehicle, score the at least one occluded region based on importance of the at least one occluded region to the predicted trajectory of the vehicle, determine a driver attention direction based on detection of the at least one of a gaze direction and a head orientation of the driver of the vehicle, and generate an occluded region alert based on the score of the at least one occluded region and the driver attention direction.

20 Claims, 10 Drawing Sheets

(51) Int. Cl.
*B60W 50/00* (2006.01)
*B60W 60/00* (2020.01)
*G06V 20/59* (2022.01)
*B60W 50/14* (2020.01)

(52) U.S. Cl.
CPC ......... *B60W 60/001* (2020.02); *G06V 20/597* (2022.01); *B60W 2050/0052* (2013.01); *B60W 2050/143* (2013.01); *B60W 2050/146* (2013.01); *B60W 2420/403* (2013.01); *B60W 2540/225* (2020.02); *B60W 2540/229* (2020.02); *B60W 2556/10* (2020.02); *B60W 2556/40* (2020.02)

(58) Field of Classification Search
CPC ... B60W 2050/0052; B60W 2050/143; B60W 2050/146; B60W 2420/403; B60W 2540/225; B60W 2540/229; B60W 2556/10; B60W 2556/40; G06V 20/597
See application file for complete search history.

(56) References Cited

U.S. PATENT DOCUMENTS

| | | | |
|---|---|---|---|
| 2016/0231746 A1* | 8/2016 | Hazelton | G05D 1/0274 |
| 2016/0272215 A1 | 9/2016 | Laine | |
| 2018/0046185 A1* | 2/2018 | Sato | G05D 1/0061 |
| 2020/0180434 A1* | 6/2020 | Tachibana | B60K 35/60 |
| 2020/0225669 A1 | 7/2020 | Silva et al. | |
| 2020/0278681 A1* | 9/2020 | Gier | G05D 1/0246 |
| 2021/0300402 A1* | 9/2021 | Wendland | H04W 4/40 |
| 2023/0132646 A1* | 5/2023 | Ratti | H04N 7/181 348/159 |

FOREIGN PATENT DOCUMENTS

| | | |
|---|---|---|
| DE | 102020206246 A1 | 11/2021 |
| GB | 2441560 A | 3/2008 |

* cited by examiner

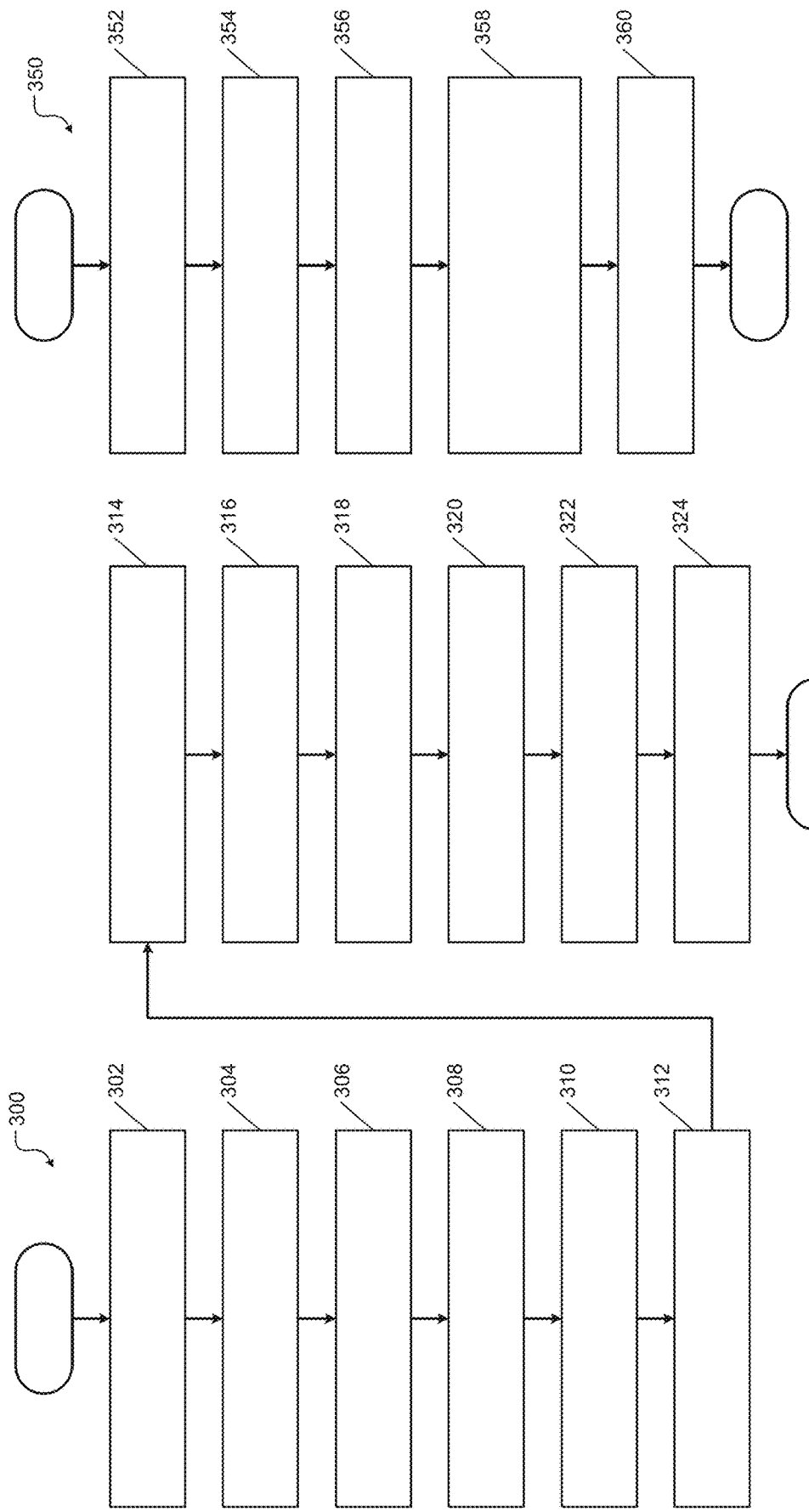

VEHICLE HUMAN-MACHINE INTERFACE ALERT GENERATION BASED ON OCCLUDED REGIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to vehicle human-machine interface (HMI) alert generation based on occluded regions, including escalation of alerts based on detected driver gaze direction and head orientation.

Vehicles utilize various sensors such as cameras, radar, and Lidar sensors installed in and around the vehicle to detect objects, by scanning the environment around the vehicle. In some driving situations, areas around the vehicle may be occluded by one or more objects, which can compromise the safety of the driver of the vehicle.

SUMMARY

An example vehicle control system includes a plurality of sensors configured to sense surroundings of a vehicle, a driver monitoring system configured to detect at least one of a gaze direction and a head orientation of a driver of the vehicle, a human-machine interface configured to provide at least one of a visual alert, a haptic alert and an audio alert to the driver, and a vehicle control module configured to identify at least one occluded region based on the plurality of sensors, each occluded region indicative of a region around the vehicle which is occluded by one or more objects detected by the plurality of sensors, determine a predicted trajectory of the vehicle, score the at least one occluded region based on importance of the at least one occluded region to the predicted trajectory of the vehicle, determine a driver attention direction based on detection of the at least one of the gaze direction and the head orientation of the driver of the vehicle, and generate an occluded region alert, via the human-machine interface, based on the score of the at least one occluded region and the driver attention direction.

In other features, the occluded region alert includes at least one of a visual notification on a display of the vehicle at a location corresponding to a direction of the at least one occluded region, a directional haptic seat alert including vibration of a portion of a vehicle seat corresponding to the direction of the at least one occluded region, or a directional audio alert including audio generated by at least one vehicle speaker at a speaker location corresponding to the direction of the at least one occluded region.

In other features, the occluded region alert includes all of the visual notification, the directional haptic seat alert and the directional audio alert.

In other features, the vehicle control module is configured to generate a map of surroundings of the vehicle, the map including the one or more objects around the vehicle detected by the plurality of sensors, and selectively filter the at least one occluded region from the map, the map comprising one or more filtered occluded regions after the selective filtering, wherein scoring the at least one occluded region includes scoring the one or more filtered occluded regions based on importance of the one or more filtered occluded regions to the predicted trajectory of the vehicle.

In other features, the vehicle control module is configured to modify the trajectory of the vehicle based on importance scores of the filtered occluded regions, and propel the vehicle according to the modified trajectory using an advanced driver assistance system.

In other features, the vehicle control module is configured to obtain a driver history associated with the driver of the vehicle, the driver history includes at least one of a historical driver attentiveness score and a historical driver alert response score, and the occluded region alert is generated based at least in part on the driver history.

In other features, the vehicle control module is configured to during generation of the occluded region alert, determine an updated score of the at least one occluded region and detect an updated driver attention direction, and terminate the occluded region alert in response to at least one of the updated score falling below an alert generation threshold, the updated driver attention direction corresponding to a direction of the at least one occluded region, or the updated driver attention direction corresponding to a direction of the occluded region alert.

In other features, the vehicle control module is configured to escalate an intensity of the occluded region alert in response to the updated score remaining above the alert generation threshold, and the updated driver attention direction not corresponding to the direction of the at least one occluded region or the direction of the occluded region alert.

In other features, the vehicle control module is configured to escalate the intensity of the occluded region alert by increasing a visual size and changing a visual color of a visual notification alert on a display of the vehicle.

In other features, the vehicle control module is configured to escalate the intensity of the occluded region alert by flashing a visual notification alert on a display of the vehicle.

In other features, the vehicle control module is configured to escalate the intensity of the occluded region alert by activating directional haptic seat impulses in a vehicle seat.

In other features, the vehicle control module is configured to escalate the intensity of the occluded region alert by generating directional audio via at least one vehicle speaker.

An example method for controlling vehicle human-machine interface alerts includes identifying at least one occluded region around a vehicle, based on a plurality of sensors configured to sense surroundings of the vehicle, each occluded region indicative of a region around the vehicle which is occluded by one or more objects detected by the plurality of sensors, determining a predicted trajectory of the vehicle, scoring the at least one occluded region based on importance of the at least one occluded region to the predicted trajectory of the vehicle, determining a driver attention direction based on detection, by a driver monitoring system of the vehicle, of at least one of a gaze direction and a head orientation of a driver of the vehicle, and generating an occluded region alert, via a human-machine interface of the vehicle, based on the score of the at least one occluded region and the driver attention direction, wherein the human-machine interface is configured to provide at least one of a visual alert, a haptic alert and an audio alert to the driver.

In other features, the occluded region alert includes at least one of a visual notification on a display of the vehicle at a location corresponding to a direction of the at least one occluded region, a directional haptic seat alert including vibration of a portion of a vehicle seat corresponding to the direction of the at least one occluded region, or a directional audio alert including audio generated by at least one vehicle speaker at a speaker location corresponding to the direction of the at least one occluded region.

In other features, the occluded region alert includes all of the visual notification, the directional haptic seat alert and the directional audio alert.

In other features, the method includes generating a map of surroundings of the vehicle, the map comprising the one or more objects around the vehicle detected by the plurality of sensors, and selectively filtering the at least one occluded region from the map, the map comprising one or more filtered occluded regions after the selective filtering, wherein scoring the at least one occluded region includes scoring the one or more filtered occluded regions based on importance of the one or more filtered occluded regions to the predicted trajectory of the vehicle.

In other features, the method includes modifying the trajectory of the vehicle based on importance scores of the filtered occluded regions, and propelling the vehicle according to the modified trajectory using an advanced driver assistance system.

In other features, the method includes obtaining a driver history associated with the driver of the vehicle, wherein the driver history includes at least one of a historical driver attentiveness score and a historical driver alert response score, and the occluded region alert is generated based at least in part on the driver history.

In other features, the method includes, during generation of the occluded region alert, determining an updated score of the at least one occluded region and detect an updated driver attention direction, and terminating the occluded region alert in response to at least one of the updated score falling below an alert generation threshold, the updated driver attention direction corresponding to a direction of the at least one occluded region, or the updated driver attention direction corresponding to a direction of the occluded region alert.

In other features, the method includes escalating an intensity of the occluded region alert in response to the updated score remaining above the alert generation threshold, and the updated driver attention direction not corresponding to the direction of the at least one occluded region or the direction of the occluded region alert.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 7 shows an example of a method for scoring occlusions.

FIG. 8 shows an example of a method for training neural networks used in a scoring module of the system shown in FIG. 2 to score occlusions.

In the drawings, reference numbers may be reused to identify similar and/or identical elements.

DETAILED DESCRIPTION

Figure 1:
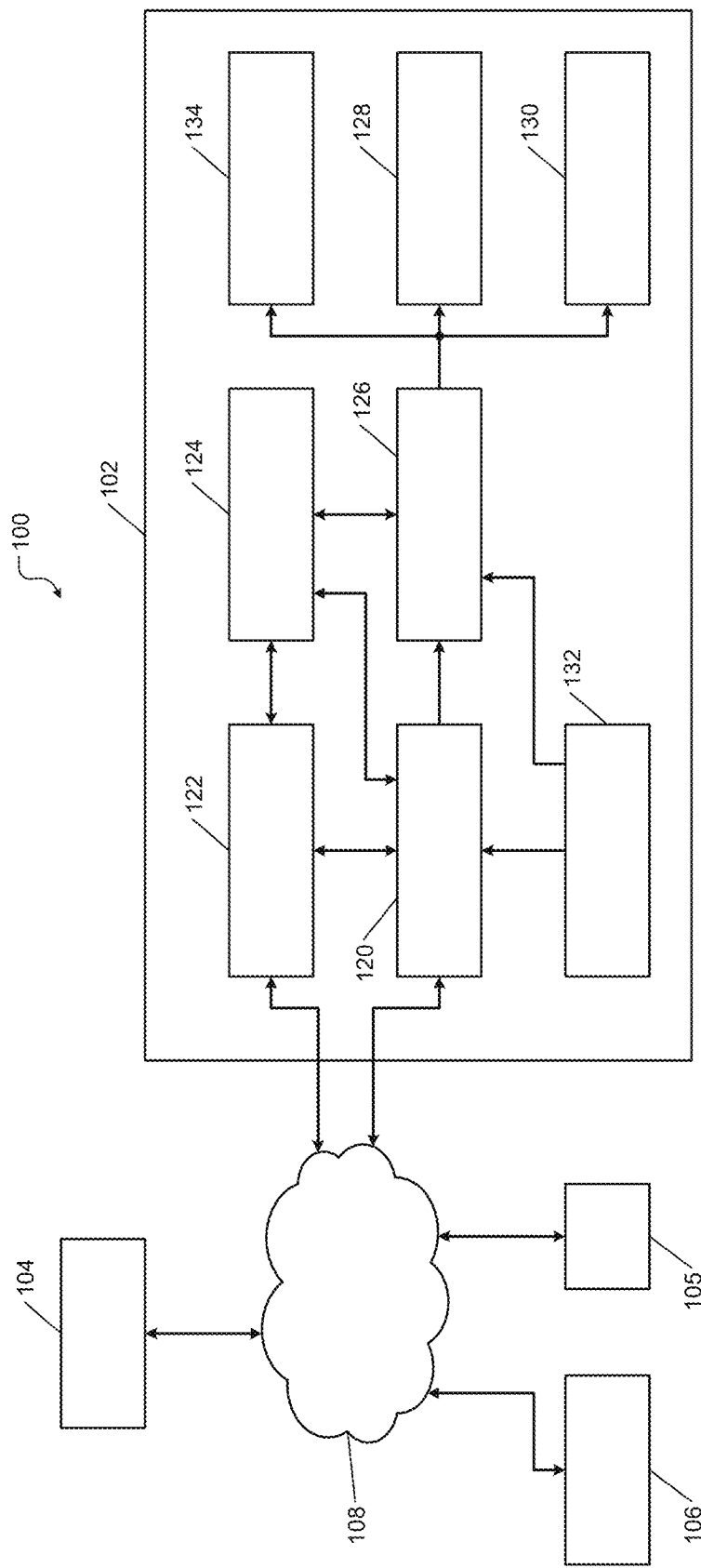
FIG. 1 shows an example of a system comprising a vehicle communicating with remote servers and systems.

Occlusions are ubiquitous in many driving scenarios, where one or more objects in an environment surrounding at least partially obstruct a view of a driver, which can compromise driver safety. For example, obstacles (such as other vehicles) coming out of occluded areas may be unsafe for a human driver that is not attentive or anticipating the obstacles.

In some example embodiments described herein, importance scores are automatically assigned by a vehicle control module to detected occluded areas in the environment surrounding the vehicle. The presence of the occluded areas, and an importance of the occluded areas, may be communicated to the driver through one or more human-machine interfaces of the vehicle (such as a visual display, haptic seat vibration, audio alerts, etc.), to inform the driver of nearby potentially hazardous conditions.

In some examples, motion planning subsystems (e.g., navigation subsystems) in autonomous and semi-autonomous vehicles (hereinafter "the vehicles") need to consider occlusions to modify trajectories of the vehicles. A trajectory is different than a motion plan or a route. A motion plan is a route that is a static element provided by a navigation subsystem on which a vehicle is driven from a source to a destination. A trajectory is a small portion or segment (i.e., a subset) of the motion plan that needs to be periodically updated depending on dynamically changing surroundings around the vehicle to adjust the movement (e.g., speed and steering) of the vehicle to propel the vehicle according to the motion plan. The present disclosure relates to periodically altering the trajectory of the vehicle depending on the dynamically changing surroundings around the vehicle.

Broadly speaking, the sensors onboard a vehicle such as cameras, radar, and Lidar sensors sense (perceive) the surroundings of the vehicle and provide sensed data about the surroundings of the vehicle to a navigation subsystem of the vehicle. The navigation subsystem generates a map of the surroundings of the vehicle based on the sensed data. The map is a snapshot of the surroundings of the vehicle. Due to various static obstacles such as buildings and dynamic obstacles such as other vehicles around the vehicle, pedestrians, cyclists, and so on, some regions of the map may be occluded. The number of unobserved or unobservable (i.e., occluded) regions on the map can rapidly increase with multiple occluding objects. For example, additional vehicles, pedestrians, objects such as cones and barricades used in road construction may appear in the map. The rapid increase in the number of occluded regions of the map increases computational demands on the motion planning subsystem.

The present disclosure provides a system and a method to alleviate the computational demands on the motion planning subsystem by determining which occluded regions are unimportant, filtering out the unimportant occlusions from the map, and assigning importance scores to the filtered occluded regions. A heuristic filter first removes unimportant occluded regions. A subsequent attention-based mechanism classifies the filtered occluded regions based on importance of the filtered occluded regions for the trajectory of the vehicle and assigning importance scores to the filtered occluded regions. The importance scores indicate how important (relevant) the occluded regions are to the trajectory of the vehicle. The motion planning subsystem then processes only the filtered occluded regions based on the importance scores assigned to the filtered occluded regions to modify the trajectory of the vehicle. The system and method of the present disclosure can be leveraged to enhance computation of both model-free and model-based planning, as well as to enhance computation of downstream tasks such as maneuvering the vehicle, providing notifications and warnings on a human-machine interface (HMI) of the vehicle, and so on.

The present disclosure is organized as follows. An example of a system comprising a vehicle communicating with remote servers and systems is shown and described with reference to FIG. 1. An example of a system for computing, filtering, and scoring occlusions around a vehicle for modifying trajectories of the vehicle is shown and described with reference to FIG. 2. Examples of occluded regions, filtered occluded regions, and scoring the filtered occluded regions around a vehicle are shown and described with reference to FIGS. 3 and 4. An example of a method for computing, filtering, and scoring occlusions around a vehicle for modifying trajectories of the vehicle is shown and described with reference to FIG. 5. An example of a method for filtering occlusions is shown and described with reference to FIG. 6. An example of a method for scoring occlusions is shown and described with reference to FIG. 7. An example of a method for training neural networks used in a scoring module to score occlusions is shown and described with reference to FIG. 8.

FIG. 1 shows a system 100 comprising a vehicle 102, one or more servers 104 (e.g., located in a cloud), a global positioning system (GPS) 105, and one or more mapping systems (hereinafter the mapping system) 106. The vehicle 102, the servers 104, the GPS 105, and the mapping system 106 communicate with each other via a distributed communication system 108. For example, the vehicle 102 can be an autonomous or a semi-autonomous vehicle that implements the system and method of the present disclosure. For example, the distributed communication system 108 may include one or more of a local area network (LAN), a wide area network (WAN), a cellular network, a WiFi network, and the Internet. For example, the servers 104 can process some of the data from the vehicle 102 and other vehicles (not shown in FIG. 1 but see examples shown in FIGS. 3 and 4). The servers 104 can provide information to the vehicle 102 to assist navigation and other subsystems of the vehicle 102 in driving of the vehicle 102.

The vehicle 102 comprises a navigation subsystem 120, a communication subsystem 122, an infotainment subsystem 124, an autonomous subsystem 126, a steering subsystem 128, a braking subsystem 130, a plurality of sensors 132, and a propulsion subsystem 134. The navigation subsystem 120 communicates with the server 104, the GPS 105, and the mapping system 106 via the distributed communication system 108. The navigation subsystem 120 may communicate with the GPS 105 directly or via the communication subsystem 122. The navigation subsystem 120 implements the system and method of the present disclosure as described below in detail with reference to FIG. 2 onwards.

The communication subsystem 122 may include one or more transceivers (e.g., a cellular transceiver, a WiFi transceiver, a GPS receiver, and a Bluetooth transceiver). The transceivers can communicate with the distributed communication system 108, the GPS 105, the servers 104, and a mobile device such as a cellular phone. The communication subsystem 122 may also communicate directly with the GPS 105. Further, the communication subsystem 122 may communicate with other vehicles (not shown) using vehicle-to-vehicle (V2V) communication technology.

The navigation subsystem 120 communicates with the infotainment subsystem 124. The infotainment subsystem 124 may comprise a display screen (e.g., a touch screen) and multimedia devices (e.g., a speaker and a microphone) for audiovisual interactions with occupants of the vehicle 102. The navigation subsystem 120 can provide maps and other audiovisual information to the occupants of the vehicle 102 via the infotainment subsystem 124. The navigation subsystem 120 can also receive audiovisual inputs from the occupants of the vehicle 102 via the infotainment subsystem 124. The navigation subsystem 120 can also receive inputs from the occupants of the vehicle 102 via a mobile device such as a cellular phone.

The navigation subsystem 120 receives data from the sensors 132. For example, the sensors 132 may include sensors that provide speed, heading, turn indication, and so on of the vehicle 102. The sensors 132 also include sensors such as cameras, radar, Lidar, and other sensors that are located on-board the vehicle 102 and that provide data about the surroundings of the vehicle 102. The navigation subsystem 120 also receives mapping data (e.g., map of the road, number of lanes, intersection, etc.) from the mapping system 106. The navigation subsystem 120 also receives GPS data (e.g., location information of the vehicle 102) from the GPS receiver in the communication subsystem 122 (or directly from the GPS 105). The navigation subsystem 120 also receives data about other vehicles from the servers 104. The navigation subsystem 120 adjusts the trajectory of the vehicle 102 based on all the data using the system and method of the present disclosure as described below in detail.

The autonomous subsystem 126 controls the operations of the vehicle 102 by controlling the steering subsystem 128, the braking subsystem 130, and the propulsion subsystem 134 based on the adjusted trajectory received from the navigation subsystem 120. For example, the propulsion subsystem 134 may comprise a motor (not shown) that propels the vehicle 102. The propulsion subsystem 134 may also comprise an engine (not shown) that works in conjunction with the motor to propel the vehicle 102. The autonomous subsystem 126 controls parameters of the motor and/or the engine according to the adjusted trajectory provided by the navigation subsystem 120.

Figure 2:
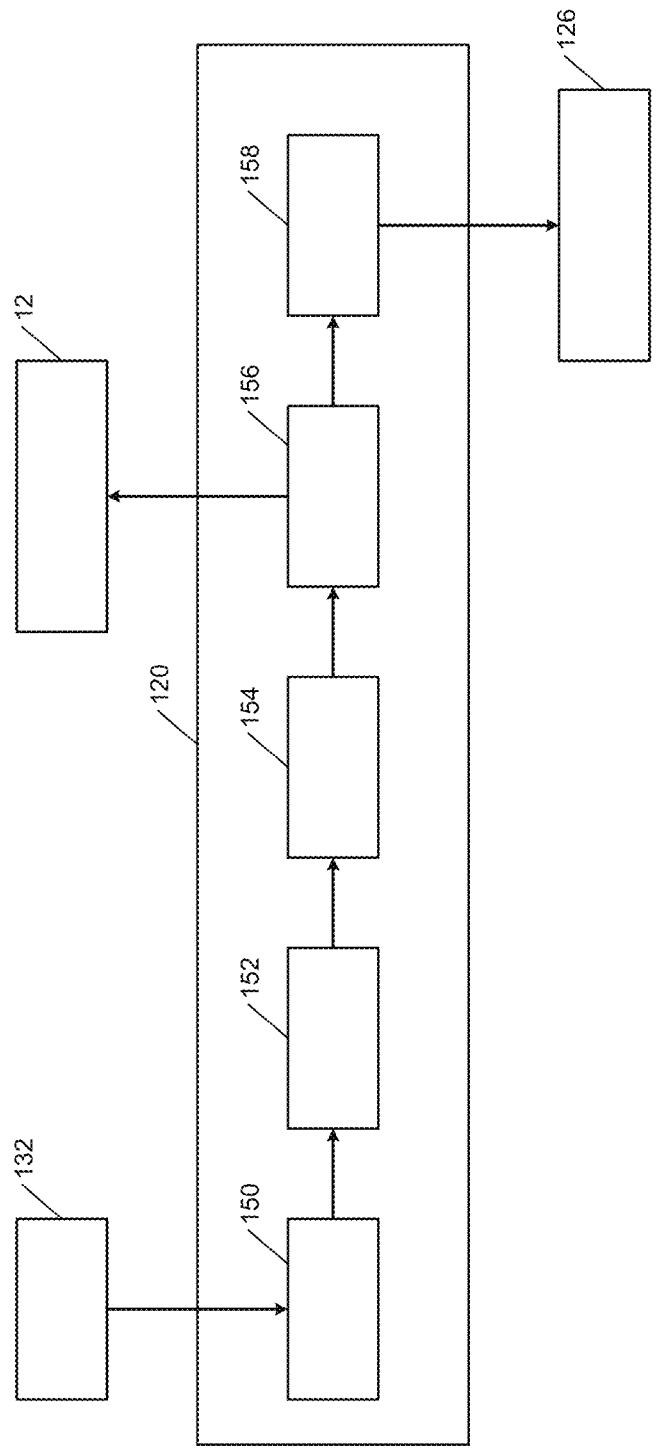
FIG. 2 shows an example of a system for computing, filtering, and scoring occlusions around a vehicle for modifying trajectories of the vehicle.

FIG. 2 shows an example of the navigation subsystem 120 for computing, filtering, and scoring occlusions around the vehicle 102 for modifying trajectories of the vehicle 102 according to the present disclosure. The navigation subsystem 120 comprises a perception module 150, an occlusion computing module 152, a filtering module 154, a scoring module 156, and a motion planning module 158. The modules are described below in detail.

The perception module 150 receives data about the surroundings of the vehicle 102 from the sensors 132, the mapping data from the mapping system 106, the GPS data from the GPS 105, and data about other vehicles from the servers 104. The perception module 150 generates a map (e.g., see FIG. 3, which is described below) of the surroundings of the vehicle 102, which is a snapshot of a scene around the vehicle 102. The perception module 150 can also be called a scene fusion module since it uses information from different sensors and fuses (e.g., combines or consolidates) the scenes captured by the different sensors to generate the map.

Figure 3:
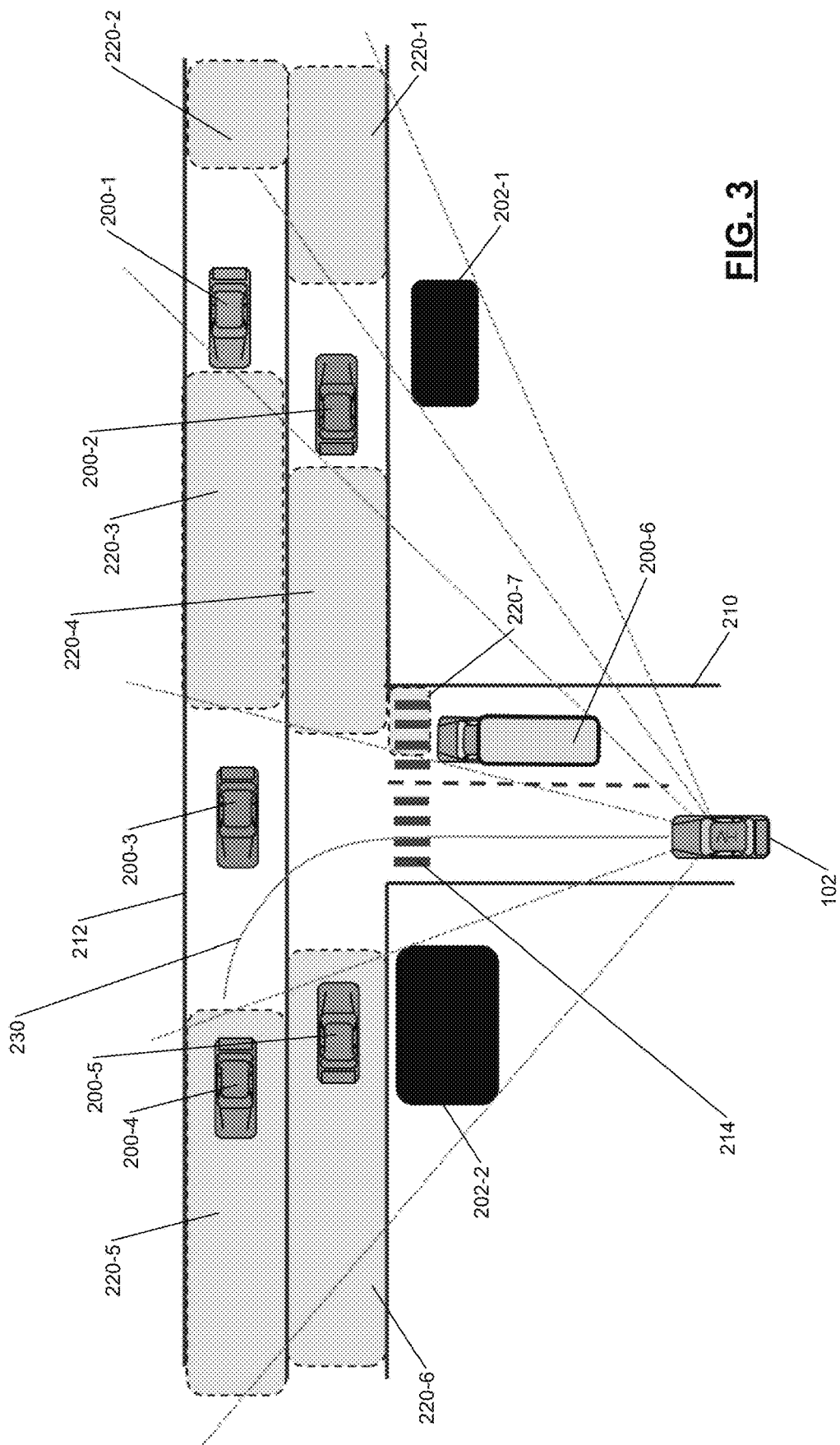
FIGS. 3 and 4 show examples of occluded regions, filtered occluded regions, and scoring the filtered occluded regions around a vehicle.

FIG. 3 shown an example of a map used to illustrate the system and the method for detecting, filtering, and scoring occlusions around the vehicle 102 for modifying trajectories of the vehicle 102 according to the present disclosure. The map shown in FIG. 3 is only an example. While the present disclosure is described with reference to a scene comprising an intersection shown in FIG. 3 as an example, the present disclosure is not so limited. Instead, the teachings of the present disclosure are applicable to any other scenario that vehicles can encounter while being driven anywhere (e.g., the vehicle 102 passing another vehicle, the vehicle 102 being passed by another vehicle, in parking lots and driveways, and so on).

In FIG. 2, the occlusion computing module 152 comprises an occlusion model that receives various inputs from the map of the surroundings of the vehicle 102 (e.g., the map shown in FIG. 3). For example, the inputs to the occlusion model in the occlusion computing module 152 include information about objects surrounding the vehicle 102 captured by the sensors 132 on-board the vehicle 102. The inputs include the state (e.g., speed, heading, and lane) of the vehicle 102 and states of various moving and stationary objects around the vehicle 102 such as other vehicles, buildings, and pedestrians around the vehicle 102. For example, in FIG. 3, the map shows the vehicle 102 and other vehicles 200-1, 200-2, 200-3, 200-4, 200-5, 200-6 (collectively called the other vehicles 200). For example, the map shows buildings 202-1, 202-2 (collectively called the buildings 202).

The inputs to the occlusion model in the occlusion computing module 152 include other information received from the mapping system 106 such as number of lanes, approaching intersection, and road signs (e.g., traffic lights, stop sign, one-way sign, etc.). For example, in FIG. 3, the map shows that the vehicle 102 is traveling in a left lane on a two-lane road 210 towards another two-lane road 212. At the intersection of the roads 210, 212, the map shows a pedestrian crossing 214.

Based on the inputs from the map and the perception module 150, the occlusion model in the occlusion computing module 152 identifies occluded regions in the map of the surroundings of the vehicle 102. For example, in FIG. 3, dashed lines are used to show lines of sight of the vehicle 102. Based on the lines of sight of the vehicle 102, the map shows occluded regions 220-1, 220-2, 220-3, 220-4, 220-5, 220-6, 220-7 (collectively called the occluded regions 220).

The filtering module 154 pre-processes the output of the occlusion model, which is the map of the surroundings of the vehicle 102 including the occluded regions 220 identified by the occlusion model in the occlusion computing module 152. The filtering module 154 filters unimportant occluded regions from the map of the surroundings of the vehicle 102 as follows.

The filtering module 154 performs the pre-processing for two reasons: first, to reduce the number of occluded regions to a maximum number of occlusions to track; and second, to eliminate computations for non-relevant occlusions. The filtering module 154 receives various inputs in addition to the output of the occlusion model, which is the map of the surroundings of the vehicle including the occluded regions identified by the occlusion model. For example, the additional inputs received by the filtering module 154 include the route, state, and current trajectory of the vehicle 102; the states of moving objects (e.g., other vehicles 200 and pedestrians) around the vehicle 102, and predictions (e.g., from the servers 104) about movement of objects around the vehicle 102 (e.g., where the objects (e.g., the vehicles 200) will imminently be located relative to the vehicle 102 (e.g., in the next few seconds)).

The filtering module 154 filters out irrelevant (unimportant) occluded regions from the map based on heuristics. For example, the heuristics can include occlusions that do not intersect the route of the vehicle 102, the size of the occluded regions 220, and proximity (e.g., distance) of the occluded regions 220 from the vehicle 102. For example, the heuristics can include an occluded region that is relatively far from the vehicle 102 (e.g., the occluded regions 220-1, 220-2), which can be disregarded and filtered out from the map. In some examples, if all of the occluded regions 220 are deemed important (relevant) to the trajectory of the vehicle 102, none of the occluded regions 220 is filtered out. Accordingly, in general, the filtering module 154 may filter out none, or one or more of the occluded regions 220 from the map.

In other examples, the heuristics can include an occluded region caused by a stationary object such as a building that is past an intersection on a downstream portion of a one-way street on which the vehicle 102 is about to turn, which can be disregarded and filtered out. For example, the heuristics can include multiple occluded regions on the lane of the vehicle 102 that are in front and rear of the vehicle 102, where the farther ones of the multiple occluded regions can be filtered out. For example, the heuristics can include temporal evolution of occlusions and objects around the vehicle 102. For example, the filtering module 154 can filter out an occlusion ahead of the vehicle 102 in the same lane if there is a closer lead vehicle in the same lane. Filtering parameters used by the filtering module 154 can be adjusted based on the type of the vehicle 102 (e.g., a sedan, a pickup truck, a recreational vehicle (RV), etc.) and/or possible presence of a vulnerable road user (VRU) in the occluded regions 220.

Figure 4:
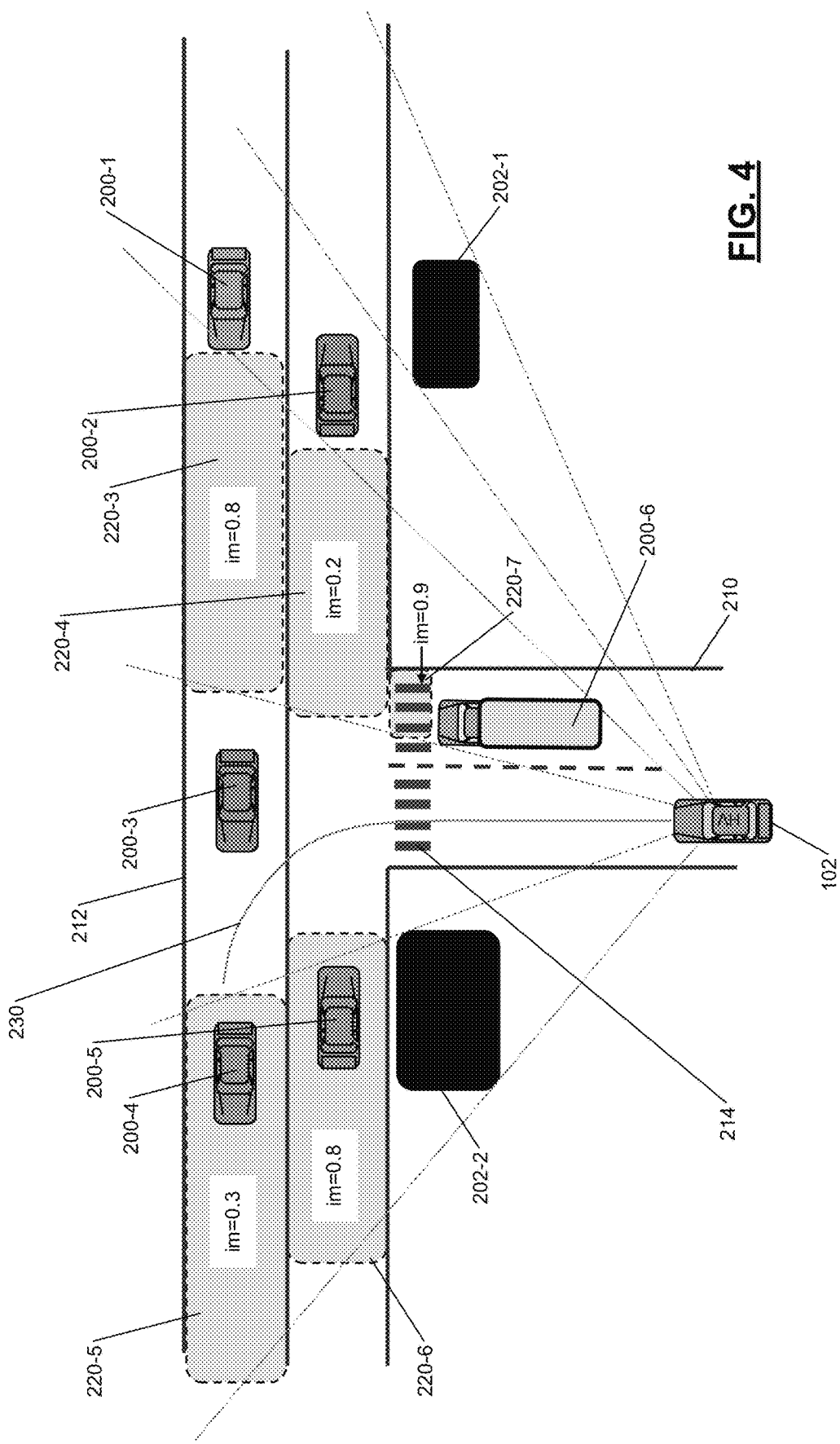

After the pre-processing (filtering) of the occluded regions 220 in the map, the filtering module 154 outputs a map with the filtered occluded regions. FIG. 4 shows an example of a map with the filtered occluded regions. In FIG. 4, the occluded regions 220-1, 220-2 shown in FIG. 3 are filtered out as explained above. Accordingly, the occluded regions 220-3 through 220-7, which remain in the map (i.e., which are not filtered out from the map) are called the filtered occluded regions. While not labeled as such in FIG. 4, to facilitate the following description, the filtered occluded regions 220-3 through 220-7 are called the filtered occluded regions 221. A method of filtering the occlusions is shown and described below with reference to FIG. 6.

The scoring module 156 scores the filtered occluded regions 221 in the map of the surroundings of the vehicle 102, which are output by the filtering module 154. The scoring module 156 scores the filtered occluded regions 221 to indicate the importance of each of the filtered occluded regions 221 that is material to the trajectory of the vehicle 102. For example, in FIGS. 3 and 4, an example of the trajectory of the vehicle 102 is shown at 230. The preprocessing (filtering) and scoring steps are performed before the motion planning module 158 processes the filtered occluded regions 221 according to the importance scores of the filtered occluded regions 221 to determine whether to change the trajectory 230 of the vehicle 102 as described below.

The scoring module 156 comprises a neural network called a deep importance network for occlusions (DINO)) that is trained to score the importance of the filtered occluded regions 221. The training methodology of the DINO is described below with reference to FIG. 8. The trained DINO utilizes an attention-based mechanism that receives input features about the trajectory 230 of the vehicle 102 and about the filtered occluded regions 221, which are described below with reference to FIG. 7. The trained DINO generates the importance scores for the filtered occluded regions 221 using the attention-based mechanism as described below with reference to FIG. 7. The motion planning module 158 can then change the trajectory 230 of the vehicle 102 based on the importance scores for the filtered occluded regions 221.

Before describing the operation of the scoring module 156 in detail with reference to FIG. 7 and the method for training the DINO in detail with reference to FIG. 8, an example of a method 250 performed by the navigation subsystem 120 of the vehicle 102 is shown and described with reference to FIG. 5. The following description of the method 250 briefly and broadly captures (summarizes) the operations performed by each module of the navigation subsystem 120 of the vehicle 102.

Figure 5:
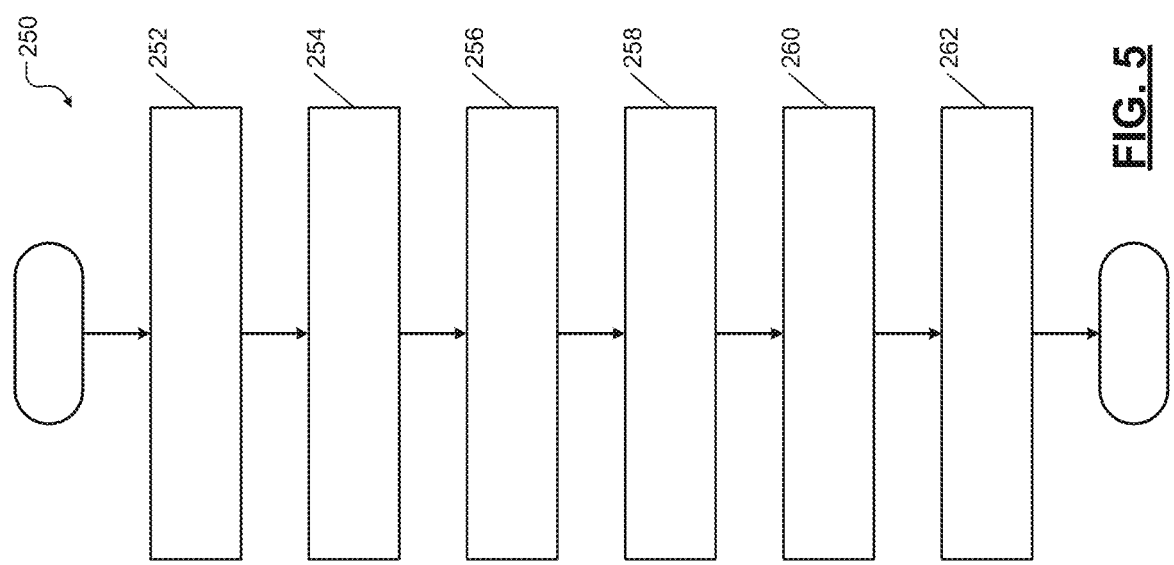
FIG. 5 shows an example of a method for computing, filtering, and scoring occlusions around a vehicle for modifying trajectories of the vehicle.

In FIG. 5, at 252, the method 250 (e.g., using the sensors 132 of the vehicle 102) senses the surroundings of the vehicle 102. At 254, the method 250 (e.g., using the perception module 150) generates a map (snapshot) of the surroundings of the vehicle 102. At 256, the method 250 (e.g., using the occlusion computing module 152) computes the occluded regions 220 in the map. At 258, the method 250 (e.g., using the filtering module 154) filters out unimportant occluded regions from the map based on heuristics. At 260, the method 250 (e.g., using the scoring module 156) generates importance scores for the filtered occluded regions 221. At 262, the method 250 (e.g., using the motion planning module 158) modifies the trajectory of the vehicle 102 based on selected importance scores.

Figure 6:
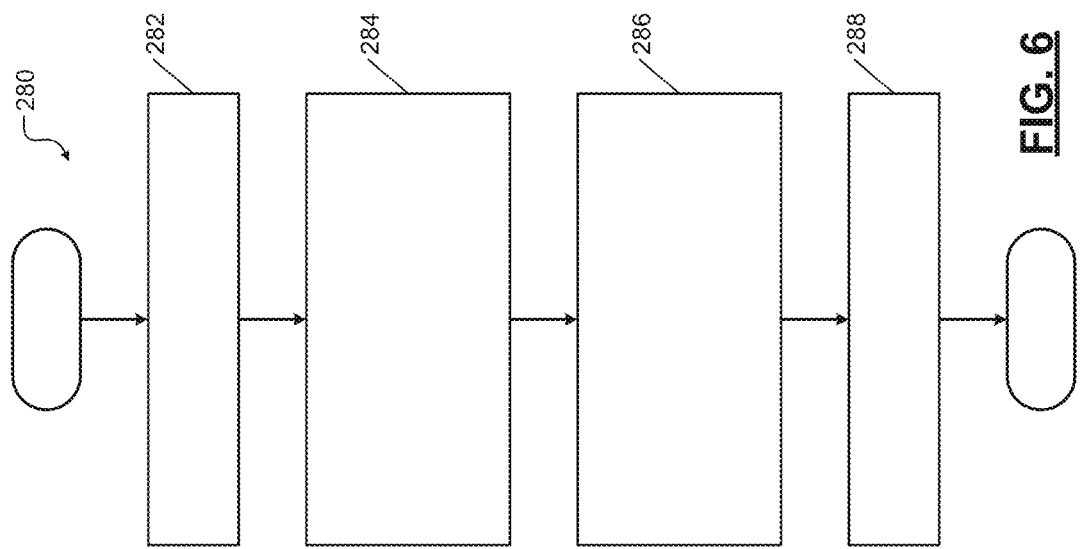
FIG. 6 shows an example of a method for filtering occlusions.

FIG. 6 shows a method 280 performed by the filtering module 154. The operations of the filtering module 154 are already described above in detail. In the following description of the method 280, the operations of the filtering module 154 are summarized. At 282, the filtering module 154 receives a map (snapshot) of the surroundings of the vehicle 102 including the occluded regions 220. At 284, the filtering module 154 receives inputs including route, state, and current trajectory of the vehicle 102; states of moving objects (e.g., the other vehicles 200, pedestrians, etc.) around the vehicle 102; and predictions about movement of the objects (e.g., the other vehicles 200) around the vehicle 102. At 286, the filtering module 154 leverages heuristics accounting for, e.g., occlusions that do not intersect the route of the vehicle 102, the size and proximity (e.g., distance) of the occluded regions 220 from the vehicle 102, and temporal evolution of the occlusions and the objects around the vehicle 102. For example, the heuristics are built into (e.g., coded in) the filtering module 154. At 288, the filtering module 154 filters out (i.e., removes) unimportant occluded regions from the map based on the inputs and heuristics and determines the filtered occluded regions 221 that are relevant to the trajectory of the vehicle 102.

Generally, the scene around the vehicle 102 (i.e., the map of the surroundings of the vehicle 102) can change dynamically. For example, the locations of the other vehicles 200 and correspondingly the occluded regions 220 can change as the vehicle 102, the other vehicles 200, and other objects such as cyclists and pedestrians continue to move. Accordingly, the process of detecting the occluded regions 220, determining the filtered occluded regions 221, calculating the importance scores of the filtered occluded regions 221, and changing the trajectory 230 of the vehicle 102 based on the importance scores can be repeated periodically (e.g., every second).

Further, the modification of the trajectory 230 of the vehicle 102 can generate alternate trajectories from which the autonomous subsystem 126 of the vehicle 102 can select a trajectory. For example, if a trajectory for the vehicle 102 is for turning left, the modified trajectory can be for executing the left turn differently (e.g., faster, slower, narrowly, widely) than planned in the original trajectory, or bringing the vehicle 102 to a complete stop. Thus, a change in trajectory can comprise alternate decisions.

FIG. 7 shows a method 300 performed by the scoring module 156 in detail. The attention-based mechanism utilized by the trained DINO in the scoring module 156 receives specific inputs about the vehicle 102 and the filtered occluded regions 221 and generates the importance scores for the filtered occluded regions 221 as described below in detail.

For example, the DINO in the scoring module 156 comprises a plurality of embedders (e.g., neural networks) that receive the inputs as follows. For the vehicle 102, the DINO in the scoring module 156 comprises a query embedder, a key embedder, and a value embedder. For each of the filtered occluded regions 221, the DINO in the scoring module 156 comprises a key embedder and a value embedder. For the filtered occluded regions 221, the key embedder and the value embedder are shared by or between the filtered occluded regions 221. The key embedder and the value embedder for the vehicle 102 are different than the key embedder and the value embedder shared by the filtered occluded regions 221.

Further, the DINO in the scoring module 156 does not use a query embedder for the filtered occluded regions 221 since the relationships between the filtered occluded regions 221 are not relevant for scoring the filtered occluded regions 221. Rather, the spatial relationship of each of the filtered occluded regions 221 to the vehicle 102 is relevant for scoring the filtered occluded regions 221. Therefore, the DINO in the scoring module 156 uses a query embedder for the vehicle 102 but does not use a query embedder for the filtered occluded regions 221.

Accordingly, the DINO in the scoring module 156 can comprise five embedders: a query embedder, a key embedder, and a value embedder (3 embedders) for the vehicle 102, plus a key embedder and a value embedder (2 embedders) shared among the filtered occluded regions 221. For example, each of the five embedders can be a separate neural network. The neural networks of the DINO in the scoring module 156 receive features described below as inputs and generate vectors described below as outputs. For each neural network, the number of layers, the width of each layer, and associated activation functions are user-defined (i.e., selectable) parameters.

For example, let N denote a maximum number of filtered occluded regions 221 to be tracked, where N is an integer greater than 1, which is selectable. In the method 300 shown in FIG. 7, at 302, for the vehicle 102, the query embedder, the key embedder, and the value embedder receive input features extracted from the trajectory 230 of the vehicle 102. For example, the input features can comprise (x, y, v, a), where x and y are 2D coordinates, v is velocity, and a is acceleration of the vehicle 102.

At 304, for each of the filtered occluded regions 221, the key embedder and the value embedder shared between the filtered occluded regions 221 receive input features of the filtered occluded regions 221. For example, the input features of the filtered occluded regions 221 comprise ($s_0$, $s_{end}$, l), where $S_0$ and $S_{end}$ are the start and end points of longitudinal coordinates of the filtered occluded region 221, and l is information about the lane where the occlusion occurs.

At 306, the query embedder for the vehicle 102 generates an output vector of dimension $N_Q$. The key embedder for the vehicle 102 generates an output vector of dimension $N_Q$. The value embedder for the vehicle 102 generates an output vector of dimension $N_V$. At 308, the key embedder for the filtered occluded region 221 generates an output vector of dimension $N_Q$. The value embedder for the filtered occluded region 221 generates an output vector of dimension $N_V$.

Subsequently, in the DINO, the keys and values from the vehicle 102 and the filtered occluded regions 221 are concatenated. For example, at 310, the keys from the vehicle 102 and the keys from the filtered occluded regions 221 are concatenated to form a key matrix K of dimension (N+1)× $N_Q$. At 312, the values from the vehicle 102 and the values from the filtered occluded regions 221 are concatenated to form a value matrix V of dimension (N+1)×$N_V$.

At 314, a query matrix Q of dimension 1×$N_q$ comprising the output of the query embedder for the vehicle 102 and the transpose of the key matrix K comprising the outputs of the key embedders for the vehicle 102 and the filtered occluded regions 221 are multiplied to generate an attention matrix of dimension 1×(N+1). At 316, the attention matrix is divided by sqrt($N_Q$). At 318, a softmax operator is applied row-wise to the attention matrix; and at 320, a resulting matrix after application of the softmax operator is multiplied by the value matrix V comprising the outputs of the value embedders for the vehicle 102 and the filtered occluded regions 221 to generate an output matrix of the DINO having dimension 1×$N_V$.

To use the output of the DINO to infer the importance scores for the filtered occluded regions 221, one of the following two approaches can be selected. A first approach enforces $N_V$=N. With the first approach, the output of the multiplication between the attention matrix and the value matrix is of the correct dimension (i.e., the maximum number of the occluded regions, N). In a second approach, another layer or a sequence of layers, called a head, can be added to the DINO. The head receives as input the 1×$N_V$ vector (i.e., the result of the multiplication between the attention matrix and the value matrix) and generates an output of dimension 1×N. Again, as with the neural networks of the embedders, the structure of the head (number of layers, width of layers and activation function) can be user-defined (i.e., selectable). Accordingly, at 322, either $N_V$=N is enforced or the output matrix of the DINO is input to a head to generate an output of dimension 1×N. At 324, the importance scores for the N filtered occluded regions 221 are inferred from the output of dimension 1×N.

Subsequently, the motion planning module 158 can select the filtered occluded regions 221 with importance scores greater than or equal to a selectable threshold and disregard the filtered occluded regions with importance scores less than the selectable threshold. The motion planning module 158 processes only the selected ones of the filtered occluded regions 221, which reduces the computational load of the motion planning module 158, and can change the trajectory 230 of the vehicle 102 based on the selected ones of the filtered occluded regions 221. Alternatively or additionally, the motion planning module 158 can process only the selected ones of the filtered occluded regions 221 and generate one or more alternate trajectories for the vehicle 102 based on the selected ones of the filtered occluded regions 221.

FIG. 8 shows a method 350 for training the DINO that is used in the scoring module 156 in detail. For example, the DINO in the scoring module 156 is trained using reinforcement learning as follows. During training, the embedders (neural networks) of the DINO receive the input features about the trajectory of the vehicle 102 and the occluded regions 220 as described above. For example, at 352, for the vehicle 102, the query embedder, the key embedder, and the value embedder receive input features extracted from the trajectory of the vehicle 102. For example, the input features can comprise (x, y, v, a), where x and y are 2D coordinates, v is velocity, and a is acceleration of the vehicle 102. At 354, for example, the key embedder and the value embedder shared between the occluded regions 220 receive input features of the occluded regions 220. For example, the input features of the occluded regions 220 comprise ($s_0$, $s_{end}$, l), where $s_0$ and $s_{end}$ are the start and end points of longitudinal coordinates of the filtered occluded region 221, and l is information about the lane where the occlusion occurs.

At 356, the DINO in the scoring module 156 generates an output comprising the importance scores for the occluded regions 220. Based on the importance sores generated by the DINO, the motion planning module 158 generates a sequence of actions (e.g., speed, acceleration, lane change, turn, etc.) for the trajectory of the vehicle 102.

At 358, the DINO is trained using a reward comprising two components. The reward comprising the two components is used to adjust weights and biases of the neural networks in the DINO. The two components balance each other such that the net reward does not increase the computational load on the motion planning module 158 and also does not compromise the comfort, safety, and speed of the vehicle 102 as follows.

A first component of the reward signal is a baseline reward generated by the motion planning module 158. The motion planning module 158 generates the first component based on factors such as how fast can the vehicle 102 complete the trajectory, how much comfort (e.g., jerk) can the trajectory generate as the vehicle 102 completes the trajectory, and how safely can the vehicle 102 complete the trajectory. The motion planning module 158 can generate the first component by optimizing one or more of these factors. For example, the motion planning module 158 may emphasize one factor (e.g., comfort) while de-emphasizing another factor (e.g., speed). For example, the motion planning module 158 can use an equation or a formula to maximize the baseline reward so that the vehicle 102 can execute the trajectory at a speed with maximum comfort and safety.

In some examples, if only the baseline reward component is used to train the DINO, the number of occluded regions detected as being important can increase, which in turn increases the computational load on the motion planning module 158. Therefore, the present disclosure adds a second reward component to the training signal used to train the DINO. The second reward component balances or offsets the baseline reward component as follows.

For example, the second reward component can be generated by summing the importance scores of the occluded regions, multiplying the sum of the importance scores by a negative coefficient, and adding the negative product to the first baseline reward component. Alternatively, the second reward component can be generated by selecting only those importance scores that are greater than a selected threshold. For example, the importance scores for occluding regions with high importance scores due to a pedestrian barging into the road, due to an oncoming vehicle such as an emergency vehicle approaching the vehicle 102, and so on can be selected. The second reward component can then be generated by summing the selected high importance scores, multiplying the sum by a negative coefficient, and adding the negative product to the first baseline reward component. The second reward component reduces the first reward component so that the DINO is not disproportionately biased to maximize factors such as comfort, safety, and speed of the vehicle 102 in the baseline reward.

Accordingly, at 358, the reward signal used to train the DINO comprises a sum of the baseline reward component and another reward component comprising a product of a negative factor and a sum of importance scores of the occluded regions. At 360, the weights and biases of the five embedders (neural networks) are adjusted using the learning signal coming from the reward. The adjustments are continued until the DINO is trained. For example, the training stops when the user decides to stop the training based on different metrics such as number of updates to the weights and biases of the neural networks (embedders). The trained DINO is then used in the scoring module 156 of the navigation subsystem 120 of the vehicle 102 as described above.

Figure 9:
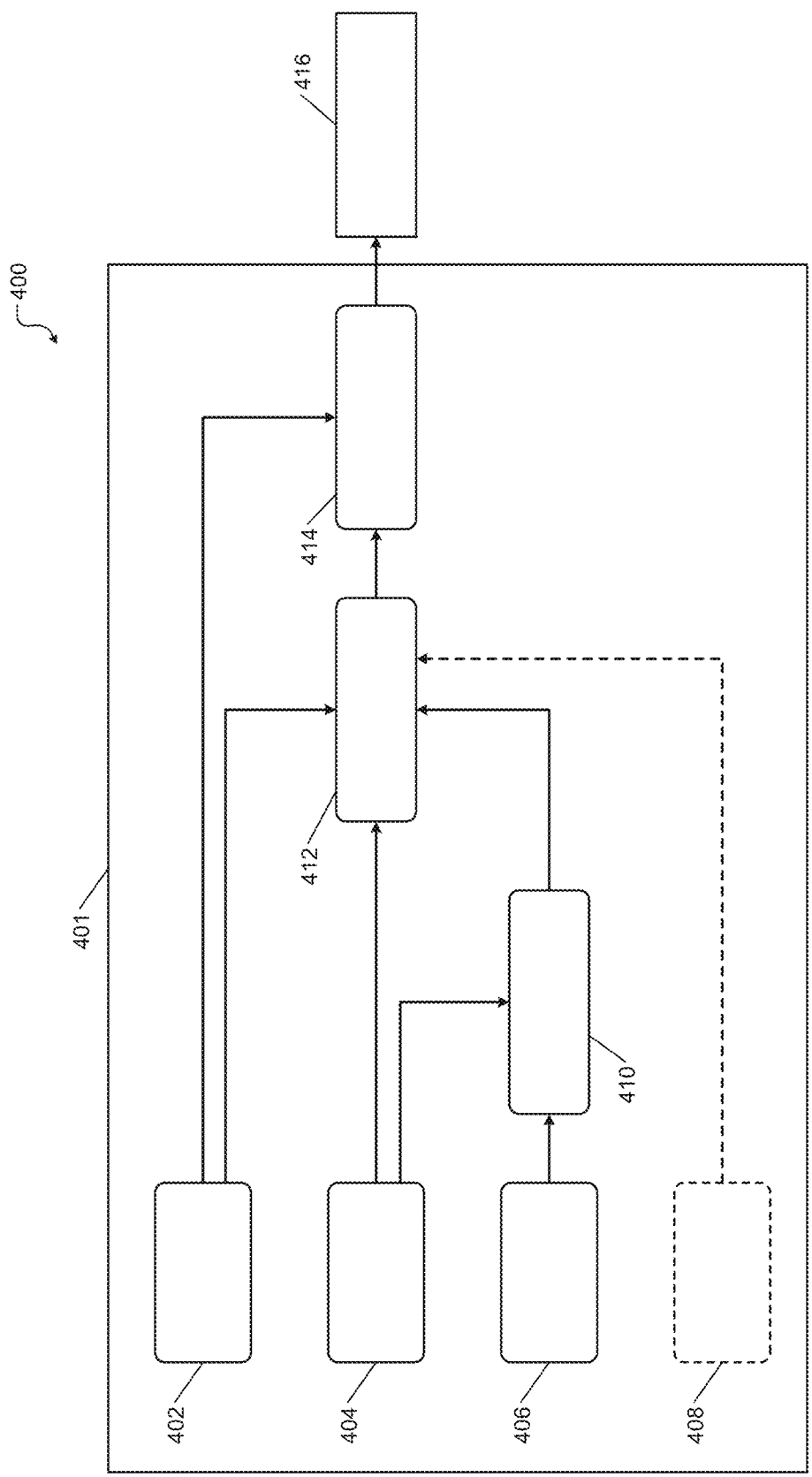
FIG. 9 is a block diagram of an example system for generating human-machine interface alerts based on detected occlusion regions.

FIG. 9 is a block diagram of an example system 400 for generating human-machine interface alerts based on detected occlusion regions. The system 400 may be executed by, for example, a vehicle control module 401 of the vehicle. As shown in FIG. 9, the vehicle control module receives driver monitoring system (DMS) input 402, which may be used to determine an attention direction of the driver.

For example, the vehicle may include one or more gaze tracking devices, head tracking devices, etc., configured to determine a direction of the driver's gaze, or an orientation of the driver's head. This information may be used by the vehicle control module 401 to determine what direction the driver is looking, in order to estimate a direction of the driver's attention or focus.

The vehicle control module 401 is configured to receive occlusion data input 404, which may include ego-centric occluded region data (e.g., data identifying occluded regions from a perspective of the driver of the vehicle). The occlusion data may include a location of occlusions, importance scores for the occlusions, etc.

In various implementations, example subsystems described herein may be used to detect occluded regions (e.g., based on vehicle sensors detecting one or more objects in a surrounding environment of the vehicle), to map occluded regions, to filter occluded regions, to generate scores for occluded regions, etc. This occlusion data may be used by the vehicle control module 401 as occlusion data input 404, in order to determine alert generation 412.

As shown in FIG. 9, the vehicle control module 401 is configured to receive a vehicle path prediction input 406. The vehicle path prediction input 406 may include data regarding a current trajectory of the vehicle, a predicted future trajectory of the vehicle, etc.

The vehicle path prediction input 406 may be generated using any suitable vehicle data, such as a current vehicle gear position (e.g., forward or reverse), a turn signal status (e.g., left or right turn signals), a current velocity and heading of the vehicle, etc. The vehicle data may be classified into one of multiple vehicle action classes, such as a vehicle continuing straight, a vehicle reversing, a left lane change, a right lane change, a left turn, a right turn, etc.

The vehicle control module 401 optionally receives driver history data input 408, which may include a historical driver attentiveness score, a historical driver response score to human-machine interface (HMI) alerts, etc. For example, the driver history data input 408 may include a score and response history for each historical driver of the vehicle (or other vehicles), which indicates how attentive the driver was to occlusions in the past.

In various implementations, driver history scores may be calculated differently for each HMI device, such as a driver having a higher score in responding to seat vibrations compared to notifications on a heads up display (HUD). Face detection may be implemented, using a driver monitoring system (DMS) camera for example, to match stored driver history scores with a specific corresponding driver.

As shown in FIG. 9, the occlusion data input 404 may be combined with the vehicle path prediction input 406 in order to execute an HMI device selection 410. For example, the vehicle control module 401 may be configured to select which HMI device to use to alert the driver to an occluded region, based on a location of the occluded region and current trajectory of the vehicle.

Example HMI alert devices may include, but are not limited to, a heads up display (HUD) in the vehicle, an interior display of the vehicle, side-view mirrors, a rear-view mirror, seat haptics (e.g., seat vibrations), and an alarm sound via a vehicle speaker. For example, if the predicted vehicle path is straight, and the occlusion location is on a right side or left side of the vehicle, the HMI device selection may include a heads up display and a left or right side mirror (e.g., to generate a visual alert on a side mirror on a same side as the occlusion, in order to increase the likelihood of the driver noticing the occlusion).

As another example, if the predicted vehicle path is a right lane change, and the occlusion location is on the right side of the vehicle, the HMI device selection 410 may include a HUD, a seat vibration, and a right side mirror alert. Providing a seat vibration may provide an enhanced alert the driver to watch out for occlusions on the side of the vehicle, if they are planning to move the vehicle to the right. Similarly, if the predicted vehicle path is a left lane change, and the occlusion location is on the left side of the vehicle, the HMI device selection 410 may include a HUD, a seat vibration, and a left side mirror alert.

As a further example, if the predicted vehicle path is travelling in reverse, and the occlusion location is on a rear left or rear right side of the vehicle, the HMI device selection 410 may include a front console and a rear-view mirror. Because the driver may be more likely to look in the rear-view mirror while backing up, or at a backup camera screen on the front console, providing occlusion alerts at these locations may increase the chances of the driver noticing the alert (e.g., a compared to a HUD or side-view mirror that the driver may not be looking at during a reverse maneuver).

As shown in FIG. 9, an alert generation 412 is determined according to the driver monitoring system input 402, the occlusion data input 404, and the HMI device selection 410, and optionally the driver history data input 408. For example, the vehicle control module 401 may cluster occluded regions into areas around the vehicle.

Figure 10:
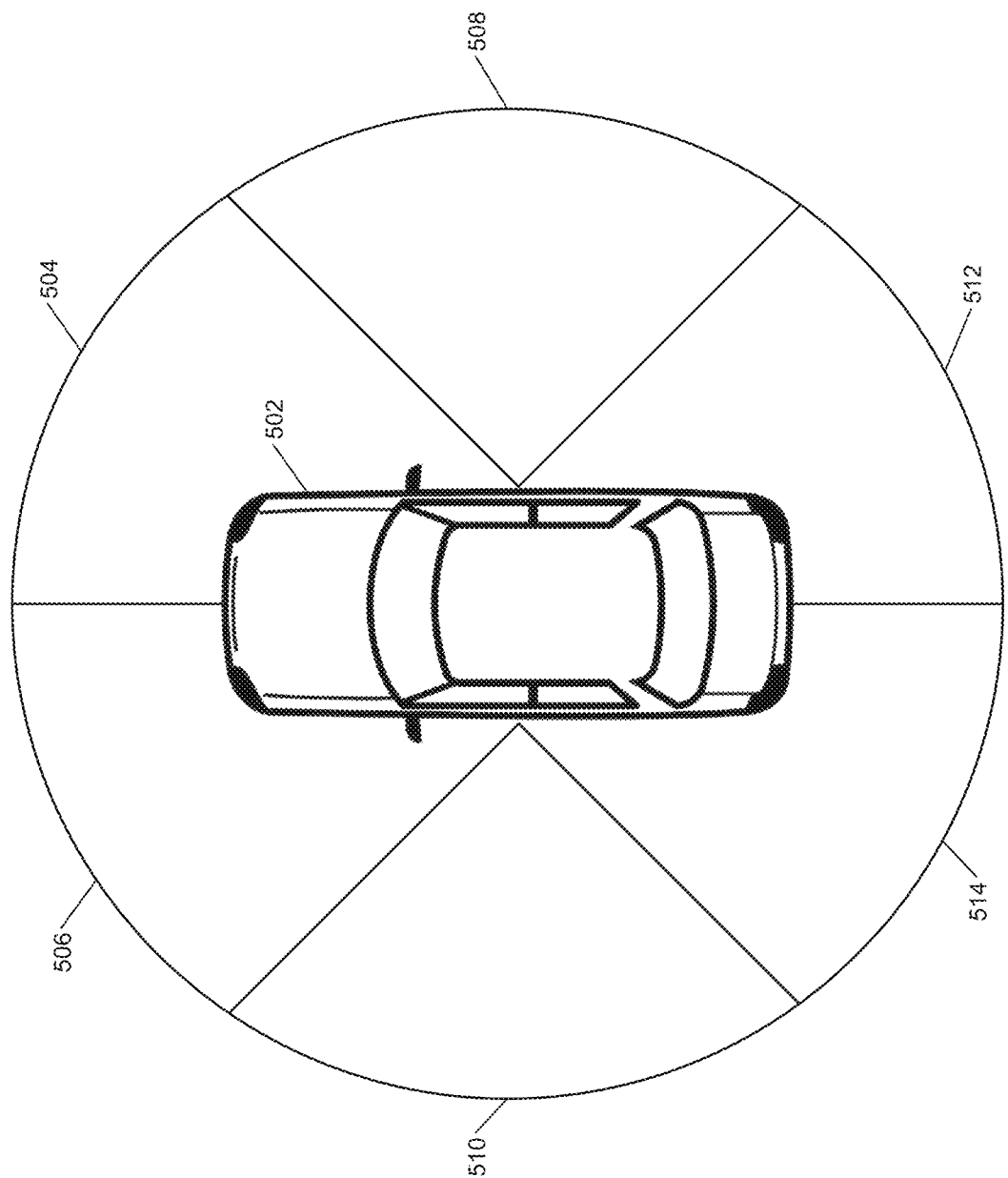
FIG. 10 is a diagram illustrating example clusters surrounding a vehicle for grouping occluded regions.

FIG. 10 is a diagram illustrating example clusters surrounding a vehicle 502, for grouping of detected occluded regions. FIG. 10 illustrates six example regions: a front right (FR) cluster 504, a front left (FL) cluster 506, a side right (SR) cluster 508, a side left (SL) cluster 510, a rear right (RR) cluster 512, and a rear left (RL) cluster 514. Other example embodiments may include more or less clusters. An importance score for each cluster may be calculated as a maximum of occlusion scores (or occlusion importance scores) for all occlusion regions within the cluster.

The HMI score for each cluster may be updated based on multiple factors. For example, a higher occlusion importance score may result in a higher HMI score for the cluster. Optionally, a cluster may receive a higher HMI score when driver history data indicates that the driver has a low historical attentiveness or response to similar HMI alerts in the past. The HMI score may be increased if, according to the driver monitoring system input 402, the gaze direction or head orientation of the driver is not in the direction of the occlusion cluster.

The type of HMI alert may be different based on the HMI device selection 410, and the occlusion cluster region. In some examples, the HMI alert may include text, symbols, audio, seat vibrations, etc. In various implementations, a coordinate transform may be executed from a vehicle-centric view to a driver-eye-centric view.

If the HMI score exceeds a specified threshold after modifications based on the cluster importance score, the driver history data, the driver gaze and head orientation data, etc., the vehicle control module 401 may execute the alert generation 412. Further details regarding an example process for determining an HMI alert generation are discussed further below with reference to FIG. 11.

Figure 11:
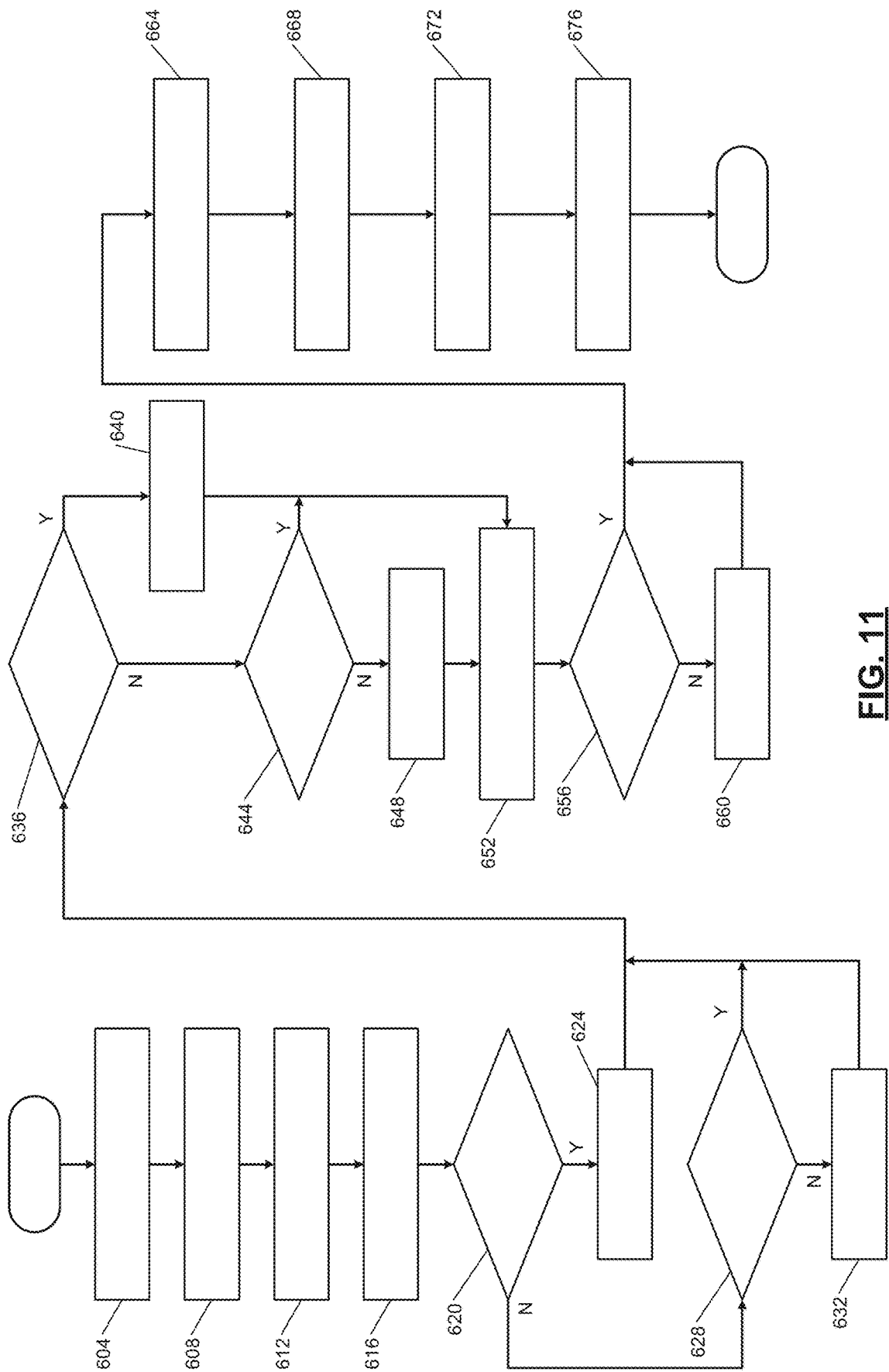
FIG. 11 is a flowchart depicting an example process for generating an HMI alert based on detected occluded regions.

FIG. 11 is a flowchart depicting an example process for generating an HMI alert based on detected occluded regions. The process of FIG. 11 may be implemented by, for example, the vehicle control module 401 of FIG. 9. At 604, the process begins by detecting that the vehicle is driving.

At 608, the vehicle control module is configured to identify occlusion areas in the driving environment (e.g., using vehicle sensors). The vehicle control module then scores the occlusion areas by importance at 612. Example processes for identifying occlusion areas and scoring the occlusion areas are discussed further above.

At 616, the vehicle control module is configured to group the occlusion regions into areas around the vehicle. For example, the vehicle control module may group occlusion region locations and scores based on the six clusters illustrated in FIG. 10.

Control is configured to determine whether an importance score is greater than a high importance score threshold, at 620. If so, control adds a high level value to the HMI alert score at 624. For example, if one of the clusters has an importance score indicating a high importance occlusion in that cluster, the likelihood of generating an HMI alert is increased (e.g., by increasing the HMI alert score towards or above the specified HMI alert generation threshold).

At 628, the vehicle control module is configured to determine whether any of the clusters have an importance score below a low importance score threshold. If not (indicating that a cluster has an importance score between the high and low importance score thresholds), control proceeds to 632 to add a medium level value to the HMI score.

At 636, control determines whether a driver historical score is less than a low threshold, indicating low historical attentiveness or alert responsiveness for the driver. If so, control adds a high level value to the HMI score at 640, to increase the likelihood that an alert will be generated for the driver.

At 644, the vehicle control module is configured to determine whether the driver historical scores is greater than a high threshold. If not (indicating that the driver historically has a medium level of attentiveness or alert responsiveness), control proceeds to 648 to add a medium level value to the HMI score.

The vehicle control module is configured to track driver eye direction and/or head orientation via a driver monitoring system, at 652. Control then determines whether the driver gaze or head orientation is directed towards the direction of the occlusion region, at 656. If not, a specified directional inattention value is added to the HMI score. For example, if a driver is already looking in the direction of the occlusion region, it may not be necessary to generate an HMI alert for the driver. If a driver is looking in a different direction than the detected occlusion region, the vehicle control module is more likely to generate an HMI alert (e.g., due to the greater safety risk if the driver is looking in a different direction).

At 664, control is configured to compile an overall HMI score. For example, the overall HMI score may include an initial HMI score calculated for each cluster, which is then modified by increasing the HMI score if the occlusion region has a high importance, if the driver has a historically low attentiveness or alert responsiveness, if the driver is not looking in the direction of the occlusion, etc.

The vehicle control module is configured to determine an appropriate method and level to deliver the alert at 668. For example, depending on the overall HMI score, the vehicle control module may determine whether to display only a visual notification, to increase an intensity of the visual notification via a size/color or flashing, to generate a haptic seat alert, to generate an audio alert via one or more speakers, etc.

At 672, control generates the determined HMI alert, such as by providing an HMI alert at an HMI output device 416. Control then proceeds to 676 to apply HMI alert escalation if necessary. For example, after an HMI alert is generated for a specified occlusion region or cluster, the type and intensity of the HMI alert may be adapted or escalated.

In some example embodiments, an HMI alert may be escalated based on a driver's direction of attention. For example, the vehicle control module 401 may implement alert escalation 414 based on whether the driver is attentive to the direction of the occluded region, using the driver gaze direction and/or head orientation as detected by the driver monitoring system.

An alert may be escalated based on an occlusion importance score. For example, if an importance score for an occlusion region increases over time (e.g., the driver's action is not appropriate for the occlusion, such as the vehicle continuing to approach the occlusion region at a high vehicle speed), the corresponding HMI alert may be escalated. Further details regarding an example process for escalating an HMI alert are discussed further below with reference to FIG. 12.

Figure 12:
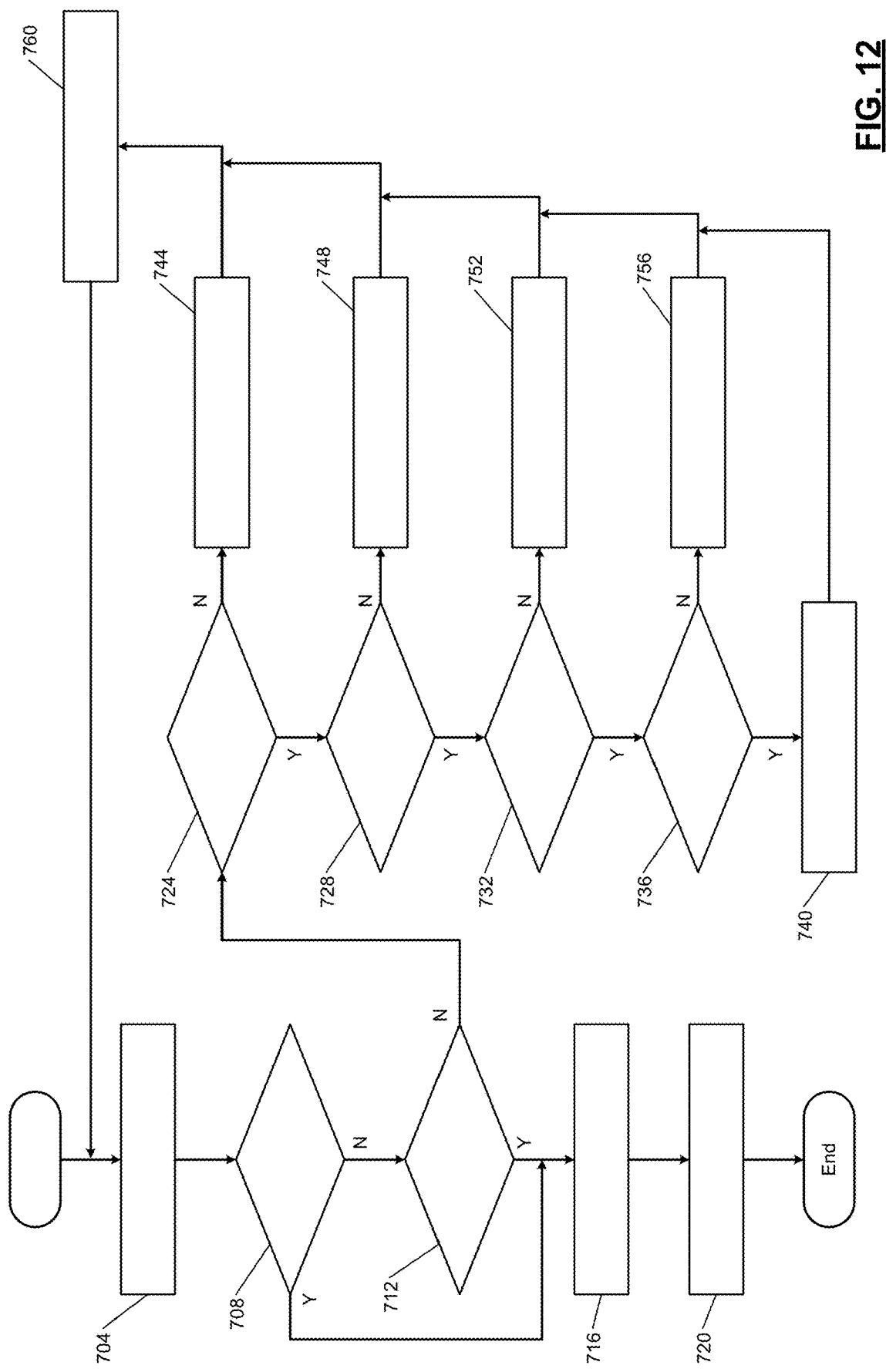
FIG. 12 is a flowchart depicting an example process for escalating an HMI alert generated based on the process of FIG. 11.

FIG. 12 is a flowchart depicting an example process for escalating an HMI alert generated based on the process of FIG. 11. The process of FIG. 12 may be implemented by, for example, the vehicle control module 401 of FIG. 9. At 704, the process begins by delivering an HMI alert to one or more HMI devices of the vehicle.

While the HMI alert is being generated, control determines whether the driver has turned a gaze direction or head orientation towards the alert region. If so, control proceeds to 716 to end the HMI alert. For example, once the driver turns their attention towards the HMI alert (or detected occlusion region), the likelihood that the driver is now are of the occlusion region is increased, and the HMI alert may end. Control then returns to identifying occlusion areas in the driving environment, at 720.

If the driver does not have their attention towards the alert region at 708, control proceeds to 712 to determine whether the importance score for the occlusion region has decreased below a specified threshold (e.g., because the vehicle has passed the occlusion region, etc.). If so, control ends the HMI alert at 716.

If the driver does not have their attention towards the alert region at 708, and the occlusion importance score is still above the threshold at 712, control proceeds to 726 to determine whether the time count has exceeded a first time threshold. For example, the vehicle control module may be configured to escalate an intensity of the HMI alert every second, every three seconds, every ten seconds, a period less than one second, etc., if the driver continues to look in a direction other than the occluded region and the occluded region remains at a high importance score.

If the time count has not exceeded the first threshold at 724, control proceeds to 744 to increase a visual size of an HMI alert and/or a color of the HMI alert. Control then increments the time count at 760, for a specified time period.

If the time count exceeds the first threshold at 724, control proceeds to 728 to determine whether the time count exceeds a second threshold (longer than the first threshold). If not, control proceeds to 748 to add visual flashing to the displayed HMI alert.

If the time count exceeds the second threshold at 728, control proceeds to 732 to determine whether the time count exceeds a third threshold (longer than the first and second thresholds). If not, control proceeds to 752 to add directional haptic seat impulses to the HMI alert.

If the time count exceeds the third threshold at 732, control proceeds to 736 to determine whether the time count exceeds a fourth threshold (longer than the first, second and third thresholds). If not, control proceeds to 756 to add directional (or non-directional) audio to the HMI alert.

If the time count exceeds the fourth threshold at 736, control may activate an advanced driver assistance system in an attempt to avoid the occluded region, or any objects that may appear from the occluded region. Example details for controlling automated driving of the vehicle to avoid objects from occluded regions, are discussed above.

If the HMI alert includes a visual alert, any suitable visual components of the vehicle may be used to display the visual alert. For example, an HMI alert may include an augmented reality HUD or a full windshield augmented reality (AR) display, a traditional HUD, high mounted displays or a reflective HUD, an interior display AR HUD, etc.

In various implementations, visual alerts may be escalated by increasing a visual alert intensity in size, color, contrast, brightness, flash frequency, etc. Audio alerts may be escalated by increasing an intensity in frequency, pitch, amplitude, localization, a time period, etc. Haptic alerts may be escalated by increasing an intensity in amplitude and frequency, by changing a waveform pattern, etc. Directional audio alerts and directional haptic seat alerts may be implemented by, for example, generating an audio alert via a speaker located on a side of the vehicle, generating vibrations on a side of the driver seat, etc.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, subsystems, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module," the term "controller," or the term "subsystem" may be replaced with the term "circuit." The term "module" or the term "subsystem" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module or subsystem may include one or more interface circuits. In some examples, the interface circuits may include wired or wireless interfaces that are connected to a local area network (LAN), the Internet, a wide area network (WAN), or combinations thereof. The functionality of any given module or subsystem of the present disclosure may be distributed among multiple modules or subsystems that are connected via interface circuits. For example, multiple modules or subsystems may allow load balancing. In a further example, a server (also known as remote server or cloud) may accomplish some functionality on behalf of a client module or subsystem.

The term code, as used above, may include software, firmware, and/or microcode, and may refer to programs, routines, functions, classes, data structures, and/or objects. The term shared processor circuit encompasses a single processor circuit that executes some or all code from multiple modules or subsystems. The term group processor circuit encompasses a processor circuit that, in combination with additional processor circuits, executes some or all code from one or more modules or subsystems. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules or subsystems. The term group memory circuit encompasses a memory circuit that, in combination with additional memories, stores some or all code from one or more modules or subsystems.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle control system comprising:
a plurality of sensors configured to sense surroundings of a vehicle;
a driver monitoring system configured to detect at least one of a gaze direction and a head orientation of a driver of the vehicle;
a human-machine interface configured to provide at least one of a visual alert, a haptic alert and an audio alert to the driver; and
a vehicle control module configured to:
identify at least one occluded region based on the plurality of sensors, each occluded region indicative of a region around the vehicle which is occluded by one or more objects detected by the plurality of sensors;
selectively filter occluded regions from a map of occlusions surrounding the vehicle, including filtering occlusions ahead of a closer lead vehicle in a same lane;
adjust parameters for selective filtering based on a type of the vehicle;
determine a predicted trajectory of the vehicle;
score the at least one occluded region based on importance of the at least one occluded region to the predicted trajectory of the vehicle;
determine a driver attention direction based on detection of the at least one of the gaze direction and the head orientation of the driver of the vehicle; and
generate an occluded region alert, via the human-machine interface, based on the score of the at least one occluded region and the driver attention direction.

2. The vehicle control system of claim 1, wherein the occluded region alert includes at least one of:
a visual notification on a display of the vehicle at a location corresponding to a direction of the at least one occluded region;
a directional haptic seat alert including vibration of a portion of a vehicle seat corresponding to the direction of the at least one occluded region; or
a directional audio alert including audio generated by at least one vehicle speaker at a speaker location corresponding to the direction of the at least one occluded region.

3. The vehicle control system of claim 2, wherein the occluded region alert includes all of the visual notification, the directional haptic seat alert and the directional audio alert.

4. The vehicle control system of claim 1, wherein the vehicle control module is configured to:
generate a map of surroundings of the vehicle, the map including the one or more objects around the vehicle detected by the plurality of sensors, the map comprising one or more filtered occluded regions after the selective filtering, wherein scoring the at least one occluded region includes scoring the one or more filtered occluded regions based on importance of the one or more filtered occluded regions to the predicted trajectory of the vehicle.

5. The vehicle control system of claim 4, wherein the vehicle control module is configured to:
modify the trajectory of the vehicle based on importance scores of the filtered occluded regions; and
propel the vehicle according to the modified trajectory using an advanced driver assistance system.

6. The vehicle control system of claim 1, wherein:
the vehicle control module is configured to obtain a driver history associated with the driver of the vehicle;
the driver history includes at least one of a historical driver attentiveness score and a historical driver alert response score; and
the occluded region alert is generated based at least in part on the driver history.

7. The vehicle control system of claim 1, wherein the vehicle control module is configured to:
during generation of the occluded region alert, determine an updated score of the at least one occluded region and detect an updated driver attention direction; and
terminate the occluded region alert in response to at least one of the updated score falling below an alert generation threshold, the updated driver attention direction corresponding to a direction of the at least one occluded region, or the updated driver attention direction corresponding to a direction of the occluded region alert.

8. The vehicle control system of claim 7, wherein the vehicle control module is configured to escalate an intensity of the occluded region alert in response to the updated score remaining above the alert generation threshold, and the updated driver attention direction not corresponding to the direction of the at least one occluded region or the direction of the occluded region alert.

9. The vehicle control system of claim 8, wherein the vehicle control module is configured to escalate the intensity of the occluded region alert by increasing a visual size and changing a visual color of a visual notification alert on a display of the vehicle.

10. The vehicle control system of claim 8, wherein the vehicle control module is configured to escalate the intensity of the occluded region alert by flashing a visual notification alert on a display of the vehicle.

11. The vehicle control system of claim 8, wherein the vehicle control module is configured to escalate the intensity of the occluded region alert by activating directional haptic seat impulses in a vehicle seat.

12. The vehicle control system of claim 8, wherein the vehicle control module is configured to escalate the intensity of the occluded region alert by generating directional audio via at least one vehicle speaker.

13. A method for controlling vehicle human-machine interface alerts, the method comprising:
identifying at least one occluded region around a vehicle, based on a plurality of sensors configured to sense surroundings of the vehicle, each occluded region indicative of a region around the vehicle which is occluded by one or more objects detected by the plurality of sensors;
determining a predicted trajectory of the vehicle;
scoring the at least one occluded region based on importance of the at least one occluded region to the predicted trajectory of the vehicle;
selectively filtering occluded regions from a map of occlusions surrounding the vehicle, including filtering occlusions ahead of a closer lead vehicle in a same lane;
adjusting parameters for selective filtering based on a type of the vehicle;
determining a driver attention direction based on detection, by a driver monitoring system of the vehicle, of at least one of a gaze direction and a head orientation of a driver of the vehicle; and
generating an occluded region alert, via a human-machine interface of the vehicle, based on the score of the at least one occluded region and the driver attention direction, wherein the human-machine interface is configured to provide at least one of a visual alert, a haptic alert and an audio alert to the driver.

14. The method of claim 13, wherein the occluded region alert includes at least one of:
a visual notification on a display of the vehicle at a location corresponding to a direction of the at least one occluded region;
a directional haptic seat alert including vibration of a portion of a vehicle seat corresponding to the direction of the at least one occluded region; or
a directional audio alert including audio generated by at least one vehicle speaker at a speaker location corresponding to the direction of the at least one occluded region.

15. The method of claim 14, wherein the occluded region alert includes all of the visual notification, the directional haptic seat alert and the directional audio alert.

16. The method of claim 13, further comprising:
generating a map of surroundings of the vehicle, the map comprising the one or more objects around the vehicle detected by the plurality of sensors, the map comprising one or more filtered occluded regions after the selective filtering, wherein scoring the at least one occluded region includes scoring the one or more filtered occluded regions based on importance of the one or more filtered occluded regions to the predicted trajectory of the vehicle.

17. The method of claim 16, further comprising:
modifying the trajectory of the vehicle based on importance scores of the filtered occluded regions; and
propelling the vehicle according to the modified trajectory using an advanced driver assistance system.

18. The method of claim 13, further comprising obtaining a driver history associated with the driver of the vehicle, wherein:
the driver history includes at least one of a historical driver attentiveness score and a historical driver alert response score; and
the occluded region alert is generated based at least in part on the driver history.

19. The method of claim 13, further comprising:
during generation of the occluded region alert, determining an updated score of the at least one occluded region and detect an updated driver attention direction; and
terminating the occluded region alert in response to at least one of the updated score falling below an alert generation threshold, the updated driver attention direction corresponding to a direction of the at least one occluded region, or the updated driver attention direction corresponding to a direction of the occluded region alert.

20. The method of claim 19, further comprising escalating an intensity of the occluded region alert in response to the updated score remaining above the alert generation threshold, and the updated driver attention direction not corresponding to the direction of the at least one occluded region or the direction of the occluded region alert.

\* \* \* \* \*